US010979284B2

(12) United States Patent
Elmquist et al.

(10) Patent No.: US 10,979,284 B2
(45) Date of Patent: Apr. 13, 2021

(54) SYSTEMS AND METHODS FOR PROVIDING CROSS-NETWORK EVENT ATTRIBUTION

(71) Applicant: GOOGLE LLC, Mountain View, CA (US)

(72) Inventors: Ryan Elmquist, Mountain View, CA (US); Lianxiao Qiu, Mountain View, CA (US); Rahul Oak, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/836,586

(22) Filed: Dec. 8, 2017

(65) Prior Publication Data

US 2018/0316546 A1 Nov. 1, 2018

Related U.S. Application Data

(60) Provisional application No. 62/491,816, filed on Apr. 28, 2017.

(51) Int. Cl.
| | | |
|---|---|---|
| *H04L 12/24* | (2006.01) | |
| *H04L 29/08* | (2006.01) | |
| *G06Q 30/02* | (2012.01) | |
| *G06F 15/163* | (2006.01) | |
| *G06F 16/9535* | (2019.01) | |
| *G06F 16/00* | (2019.01) | |

(52) U.S. Cl.
CPC .......... *H04L 41/064* (2013.01); *G06F 15/163* (2013.01); *G06F 16/00* (2019.01); *G06F 16/9535* (2019.01); *G06Q 30/02* (2013.01); *G06Q 30/0241* (2013.01); *H04L 67/10* (2013.01); *H04L 67/12* (2013.01)

(58) Field of Classification Search
CPC ..................................................... H04L 41/064
See application file for complete search history.

(56) References Cited

U.S. PATENT DOCUMENTS

2004/0064450 A1* 4/2004 Hatano ................... G06F 16/29
2011/0191714 A1 8/2011 Ting et al.
(Continued)

FOREIGN PATENT DOCUMENTS

| JP | 2014-515517 A | 6/2014 |
| WO | WO-2009/117733 A2 | 9/2009 |
| WO | WO-2014/203001 | 12/2014 |

OTHER PUBLICATIONS

International Search Report and Written Opinion on PCT Appln. Ser. No. PCT/US2017/065899 dated Mar. 1, 2018 (13 pages).
(Continued)

*Primary Examiner* — Ario Etienne
*Assistant Examiner* — Sm Z Islam
(74) *Attorney, Agent, or Firm* — Foley & Lardner LLP

(57) ABSTRACT

Systems and methods that may be used to provide cross content network event attribution are provided. One method includes receiving, by a coordination server, an event attribution request for a second event from an attribution server, the second event is an online activity performed by a user via one of a plurality of user devices after a first event, the first event is another online activity performed by the user via one of the plurality of devices. The method includes determining, by the coordination server, whether the second event is attributable to the first event.

20 Claims, 5 Drawing Sheets

(56) References Cited

U.S. PATENT DOCUMENTS

| | | | |
|---|---|---|---|
| 2011/0246267 A1* | 10/2011 | Williams | G06Q 30/0255 |
| | | | 705/14.4 |
| 2014/0365296 A1* | 12/2014 | McDonnell | G06Q 30/0277 |
| | | | 705/14.45 |
| 2015/0066634 A1* | 3/2015 | Armon-Kest | G06Q 30/0269 |
| | | | 705/14.45 |
| 2015/0199767 A1* | 7/2015 | Sulur | G06Q 40/12 |
| | | | 705/30 |
| 2016/0328739 A1 | 11/2016 | Synett et al. | |

OTHER PUBLICATIONS

Office Action on GB Appln. Ser. No. 1721008.9 dated Jun. 12, 2018 (6 pages).
Preliminary Report on patentability on PCT Appln. Ser. No. PCT/US2017/065899 dated Nov. 7, 2019 (7 pages).
Foreign Action other than Search Report on KR 10-2019-7022470 Dated Mar. 30, 2020.
Examination Report for EP Appln. Ser. No. 17826037.8 dated Apr. 14, 2020 (5 pages).
Examination Report for GB Appln. Ser. No. 1721008.9 dated May 20, 2020 (4 pages).
Final Office Action for KR Appln. Ser. No. 10-2019-7022470 dated Oct. 16, 2020 (14 pages).
Reasons for Refusal for JP Appln. Ser. No. 2019-541308 dated Nov. 16, 2020 (14 pages).

\* cited by examiner

SYSTEMS AND METHODS FOR PROVIDING CROSS-NETWORK EVENT ATTRIBUTION

CROSS-REFERENCE TO RELATED PATENT APPLICATION

This application claims the benefit of and priority to U.S. Provisional Patent Application No. 62/491,816 filed Apr. 28, 2017, the entire disclosure of which is incorporated by reference herein.

BACKGROUND

Data exchanges between multiple computing systems controlled by multiple different parties can result in complex timelines. Some applications try to identify correlations between data events without possession of all event data. This can result in conflicting views of event history and may lead to disagreement about attribution or effect. Past attempts to resolve this disagreement have required excessive data sharing and generally incurred additional network utilization, adding undesirable latency and delay to data exchanges.

SUMMARY

One illustrative method for providing cross content network event attribution includes receiving, by a first coordination server, an event attribution request for a second event from an attribution server, the second event is an online activity performed by a user via one of a plurality of user devices after a first event, the first event is another online activity performed by the user via one of multiple user devices. The method includes determining, by the first coordination server, whether the second event is attributable to the first event by searching a plurality of confirmation messages for multiple events including the first event. The method further includes sending, by the first coordination server, data descriptive of the first event to the attribution server in response to determining that the second event is attributable to the first event.

In some implementations, the method further includes receiving, by the first coordination server, an indication of agreement or an indication of disagreement for the attribution of the second event to the first event from the attribution server.

In some implementations the method further includes determining, by the attribution server, whether the second event is attributable to the first event, determining whether the second event is attributable to the first event is performed without accessing, by the attribution server, the multiple confirmation messages.

In some implementations, the method includes receiving, by the attribution server, a notification of the second event and sending, by the attribution server, the event attribution request for the second event to the first coordination server. In some implementations the method includes receiving, by the attribution server, the data descriptive of the first event from the first coordination server and determining, by the attribution server, whether the second event is attributable to the first event based on the data descriptive of the first event. In some implementations, the method includes sending, by the attribution server, the indication of agreement to the first coordination server in response to determining that the second event is attributable to the first event and sending the indication of disagreement to the first coordination server in response to determining that the second event is not attributable to the first event.

In some implementations, the method includes determining, by the attribution server, whether the second event is attributable to the first event by determining whether a duration in time between a first time stamp of the first event and a second time stamp of the second event is less than a predefined amount, the data descriptive of the first event includes the first time stamp of the first event.

In some implementations, the method includes determining, by the first coordination server, whether the second event is attributable to the first event by searching the multiple confirmation messages with an identifier associated with the second event to determine a match between the identifier associated with the second event and an identifier associated with the first event.

In some implementations, the method includes searching the multiple confirmation messages with an identifier associated with the second event to determine a match between the identifier associated with the second event and the identifier associated with the first event by determining, based on an identifier map that maps the identifier of the second event to the identifier associated with the first event, whether the identifier of the first event maps to the identifier of the second event.

In some implementations, the method includes sending, by the attribution server, the event attribution request for the second event to a second coordination server and receiving, by the attribution server, data descriptive of an event associated with the second coordination server from the second coordination server. In some implementations, the method includes determining, by the attribution server, whether the second event is attributable to the event associated with the second coordination server based on the data descriptive of the event associated with the second coordination server. In some implementations, the method includes sending, by the attribution server, the indication of agreement to the first coordination server in response to determining that the first event is attributable to the second event and sending, by the attribution server, the indication of disagreement to the second coordination server in response to determining that the event associated with the second coordination server is not attributable to the second event.

In some implementations, the method includes updating, by the first coordination server, attribution metrics of the first coordination server to indicate that the first event is attributable to the second event in response to receiving the indication of agreement from the attribution server. In some implementations, the method includes updating, by the second coordination server, attribution metrics of the second coordination server to indicate that the event associated with the second coordination server is not attributable to the second event in response to receiving the indication of disagreement from the attribution server.

In some implementations, the method includes determining, by the attribution server, whether the second event is attributable to events associated with the data descriptive of the event associated with the second attribution server by determining whether a time stamp associated with the first event or a time stamp associated with the event associated with the second coordination server is closer in time to a time stamp associated with the second event, the data descriptive of the event associated with the second coordination server includes the time stamp associated with the event associated with the second coordination server.

One illustrative system for providing cross content network event attribution includes a first coordination server including a processing circuit. The processing circuit is configured to receive an event attribution request for a second event from an attribution server, the second event is an online activity performed by a user via one of multiple user devices after a first event, the first event is another online activity performed by the user via one of the multiple user devices. The processing circuit is configured to determine whether the second event is attributable to the first event by searching multiple confirmation messages for multiple events including the first event and send data descriptive of the first event to the attribution server in response to determining that the second event is attributable to the first event. Further, the processing circuit is configured to receive an indication of agreement or an indication of disagreement for the attribution of the second event to the first event from the attribution server.

In some implementations, the processing circuit is configured to determine whether the second event is attributable to the first event by searching the multiple confirmation messages with an identifier associated with the second event to determine a match between the identifier associated with the second event and an identifier associated with the first event.

In some implementations, the processing circuit is configured to search the multiple confirmation messages with an identifier associated with the second event to determine a match between the identifier associated with the second event and the identifier associated with the first event by determining, based on an identifier map that maps the identifier of the second event to the identifier associated with the first event, whether the identifier of the first event maps to the identifier of the second event.

In some implementations, the processing circuit is configured to update attribution metrics of the first coordination server to indicate that the first event is attributable to the second event in response to receiving the indication of agreement from the attribution server.

Another illustrative system for providing cross content network event attribution includes an attribution server that includes a processing circuit. The processing circuit is configured to receive a notification of a second event, the second event is an online activity performed by a user via one of multiple user devices after a first event associated with a first coordination server, the first event is another online activity performed by the user via one of the multiple user devices. The processing circuit is configured to send an event attribution request for the second event to the first coordination server. The processing circuit is configured to receive data descriptive of the first event from the first coordination server, determine whether the second event is attributable to the first event, and send an indication of agreement to the first coordination server in response to determining that the second event is attributable to the first event. The processing circuit is configured to send an indication of disagreement to the first coordination server in response to determining that the second event is not attributable to the first event.

In some implementations, the processing circuit is configured to determine whether the second event is attributable to the first event by determining whether the second event is attributable to the first event without accessing, by the attribution server, multiple confirmation messages stored by the first coordination server, the coordination messages including information about events associated with the first coordination server including the first event.

In some implementations, the processing circuit is configured to determine whether the second event is attributable to the first event by determining whether a duration in time between a first time stamp of the first event and a second time stamp of the second event is less than a predefined amount, the data descriptive of the first event includes the first time stamp of the first event.

In some implementations, the processing circuit is configured to send the event attribution request for the second event to a second coordination server, receive data descriptive of an event associated with the second coordination server from the second coordination server. The event associated with the second coordination server can be another online activity performed by the user via one of the multiple user devices before the second event. The processing circuit can be configured to determine whether the second event is attributable to the event associated with the second coordination server, and send the indication of disagreement to the second coordination server in response to determining that the event associated with the second coordination server is not attributable to the second event.

In some implementations, the processing circuit is configured to determine whether the second event is attributable to the first event by determining whether a first time stamp associated with the first event or a third time stamp associated with the event associated with the second coordination server is closer in time to a second time stamp associated with the second event, the data descriptive of the event associated with the second coordination server includes the third time stamp.

In some implementations, the indication of agreement and the indication of disagreement cause the first coordination server to update attribution metrics of the first coordination server to indicate that the first event is attributable or is not attributable to the second event.

Following below are more detailed descriptions of various concepts related to, and implementations of, these and similar methods, apparatuses, and systems. The various concepts introduced above and discussed in greater detail below may be implemented in any of numerous ways, as the described concepts are not limited to any particular manner of implementation.

BRIEF DESCRIPTION OF THE DRAWINGS

The above and related objects, features, and advantages of the present disclosure will be more fully understood by reference to the following detailed description, when taken in conjunction with the accompanying figures, wherein.

Figure 1A:
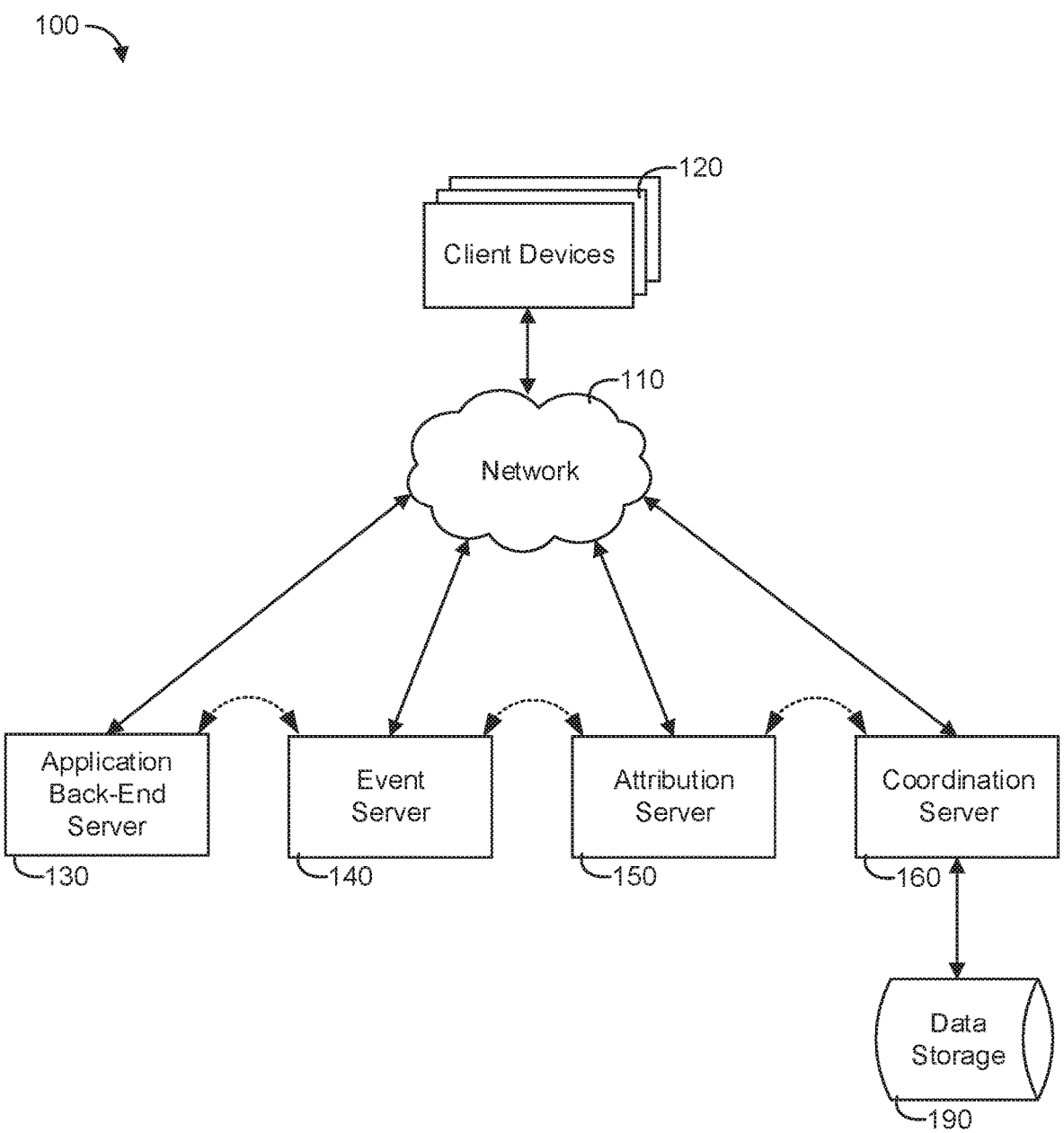
FIG. 1A is a block diagram illustrating servers that can perform cross-network event attribution, according to an illustrative implementation.

For purposes of clarity, not every component may be labeled in every figure. The drawings are not intended to be

DETAILED DESCRIPTION

Referring generally to the FIGURES, various illustrative systems and methods for determining attribution between events that occur across various content networks are shown, according to various implementations. As described herein, an attribution server and one or more coordination servers can be configured to perform attribution of various events. The events may be online interactions that a user may perform with online resources via various user devices. The systems and methods described herein can achieve real time, efficient attribution of the events with improved data security.

The attribution server as described herein may be a server configured to perform attribution between various online activities that a user may perform. The coordination servers can be a server configured to receive indications of the online activity of the user, store the online activity of the user, and communicate with the attribution server to determine attribution between activities. When a content provider uses multiple coordination servers (e.g., a content provider provides content over multiple online content distribution networks), a user may interact with content items of the coordination servers before performing a conversion. Each coordination server may attribute the conversion to events associated with the respective coordination servers. However, this may be an error since only an event of one of the coordination servers should receive attribution for the conversion, not both since only one conversion has occurred. In this regard, the attribution server can be configured to correct the duplication of conversion attribution via the systems and methods described further herein.

In some of the implementations described herein, reference is made to a first event and a second event. The first event may be an online activity, such as an interaction with a content item provided via an online content distribution network (e.g., viewing and/or clicking through a content item impression), that can be performed by a user via a user device, e.g., a cellphone or personal computer. The coordination server may receive and store data for the first event or any number of events similar to the first event. A subsequent event, referred to herein according to some implementations as the second event, may be another user activity performed by the user with a user device that occurs after the first event. In some implementations, the second event is a conversion. A conversion may include downloading and/or installing a user application, performing a purchase of a good and/or service, watching a video, subscribing to a server, etc. Through the methods described herein, attribution can be determined between the first and second events.

Data security can be improved by the systems and methods described herein through limitations placed on the data exchanged between the coordination server and the attribution server. For example, to determine event attribution, all online activity of a user could be compiled by the attribution server and attribution between events could be determined by the attribution server based on the aggregate data set. However, aggregating event data may be undesirable for data privacy. Instead, the coordination servers described herein may only provide sufficient information about the first event to the attribution server so that the attribution server can confirm or deny attribution without obtaining data relating to all the events of the user from a coordination server, or even without obtaining all of the information about the first event from the coordination server. Furthermore, network bandwidth is conserved by constraining the exchange to attributable events through the constrained communications between the attribution server and the coordination server instead of communicating large sets of user event data.

Generally, the methods described herein may include receiving, by the coordination server, data for the first event and a request for attribution of a second event that occurs subsequent to the first event from the attribution server. In response to receiving the request for attribution for the second event, the coordination server can identify the first event by performing a search on stored event data. The stored event data can include any number of user events and may include data pertaining to the first event.

The coordination server can identify an attributable event from the stored event (the first event). The coordination server can return a description of the first event to the attribution server. In some implementations, the multiple coordination servers identify attributable events and provide the attribution server with the attributable events. The attribution server can either confirm or deny the attributions proposed by the coordination servers based on the descriptions of the events. The attribution server can send an indication of agreement or disagreement to each of the coordination servers.

In some implementations described herein, multiple coordination servers may receive indications of online user activities across various content networks. A content provider that provides content items to users via two different content networks may want to understand how a user interacts with their content items across both content networks. A first coordination server may receive indications of user activity with content items associated with the first content network while a second coordination server may receive indications of user activity with content items associated with the second content network.

The attribution server may become aware of a second event performed by the user. This event may be a conversion that a user performs after viewing or interacting with content of the first content network and content of the second content network. Both coordination servers may determine that they have caused the conversion and may display conversion metrics in their respective user interfaces that take into account the conversion. However, since only one conversion has occurred, the conversions reported by the coordination servers are duplicates and should actually only be attributed to an event associated with one of the coordination servers.

To correct this duplication, the attribution server can send requests for attribution to the two coordination servers and in return receive potentially attributable events from the coordination servers. Based on these potentially attributable events, the attribution server can determine whether the conversion event is attributable to the online user activity associated with the first coordination server or the online user activity associated with the second coordination server. In some implementations, the first and second coordination servers send information to the attribution server regarding the respective online user interactions. This information may include the time stamps that the interactions occurred. The attribution sever may select only one of the online user interactions as attributable to the conversion based on the time stamps. The attribution server can attribute only the event occurring closest in time to a time stamp of the conversion.

The attribution server can send a confirmation or a rejection of attribution to the first and second coordination servers. For example, if the attribution server determines that the online event activity performed by the first coordination server should receive attribution, the attribution server can send a notification of attribution to the coordination server and a notification of non-attribution to the second coordination server. In this regard, both coordination servers can more accurately update the data metrics that they store and/or present to a user. The first coordination server may determine (or maintain) that the user interaction associated with the coordination server is attributable to the conversion in response to receiving a notification of attribution from the attribution server. However, the second coordination server can determine, based on the indication of no attribution, that the user interaction associated with the second coordination server should not be counted as causing the conversion.

In some embodiments, each coordination server may include a dashboard allowing a content provider to view metrics associated with user activity. Each dashboard may allow a content provider to either enable or disable deduplication of events via the cross-network event attribution systems and methods described herein. Similarly, the attribution server may include a dashboard allowing a content provider to view metrics associated with user activity, the user activity associated with one or more coordination servers. In this regard, the coordination servers can include dashboards that report user activity received by each respective coordination server. Enabling deduplication can cause the coordination server to participate in the attribution method facilitated by the attribution server. Disabling the deduplication can cause the coordination server to ignore any requests or notifications received from the attribution server.

For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Referring now to FIG. 1A, a block diagram illustrating an example computing environment 100 for performing event attribution is shown, according to an illustrative implementation. The computing environment 100 is shown to include a network 110 (e.g., the Internet), through which client device 120 can be configured to communicate with other network-connected computer systems, such as servers providing resources to the client devices 120. The resources may be e-mails, web pages, media streaming, and application support.

FIG. 1A is shown to include an application back-end server 130, an event server 140, an attribution server 150, and a coordination server 160. The servers can communicate via the network 110, via a separated private network or back plane (not shown), or via direct links. The servers may be operated by independent parties, may be operated by same parties, and/or may be consolidated. Some servers may maintain data for use in the server's functionality, e.g., the coordination server 160 is shown in communication with data storage 190.

Figure 1B:
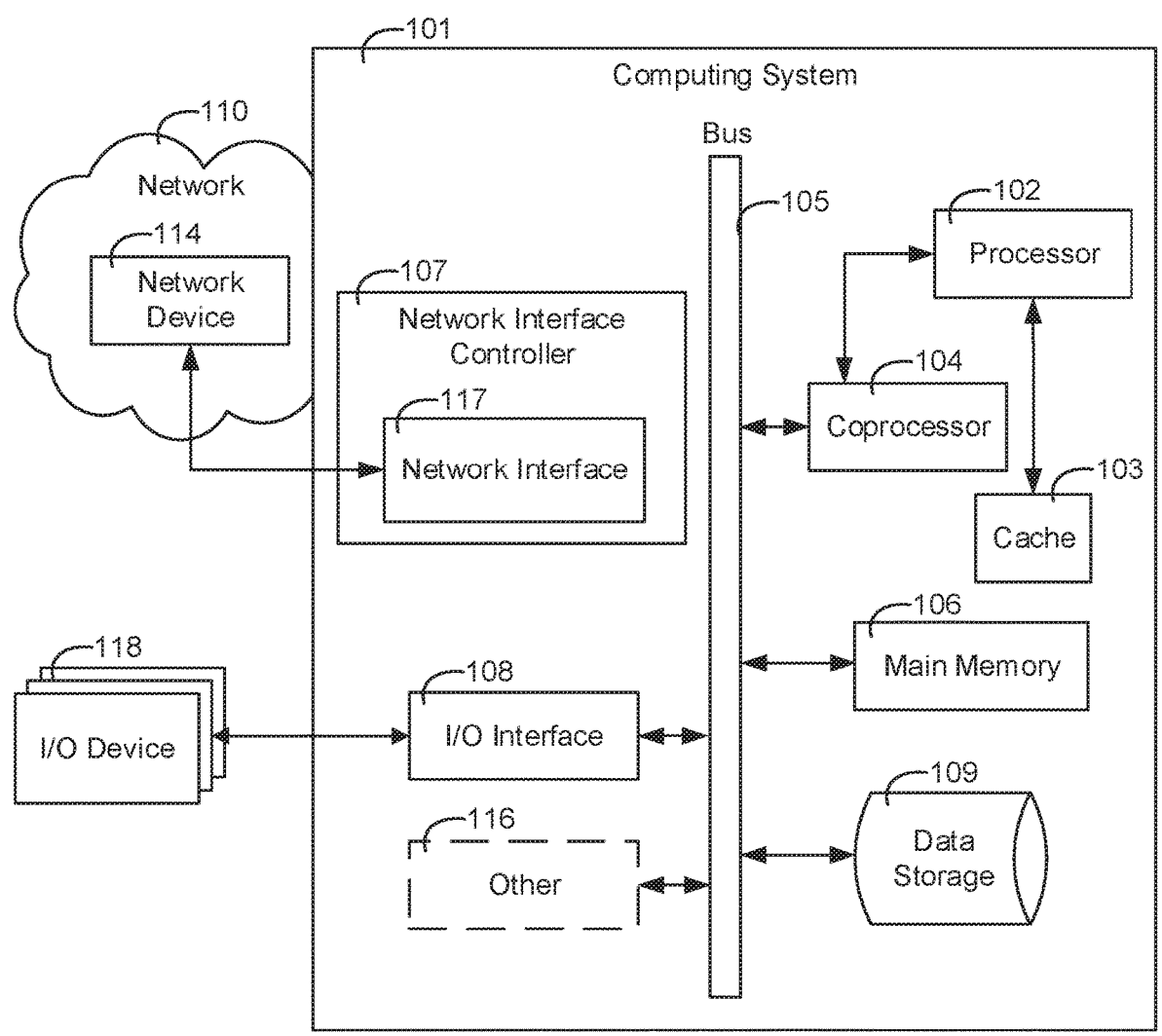
FIG. 1B is a block diagram illustrating an example computing device suitable for use in the various implementations described herein, according to an illustrative implementation.

The client devices 120, the application back-end server 130, the event server 140, the attribution server 150, and/or the coordination server 160 can be configured to perform various methods (e.g., the methods as described with reference to FIGS. 2-3) via one or more processing circuits. FIG. 1B, as described with further reference herein, provides a block diagram that illustrates an example computing device 101 with a processing circuit (e.g., a processor and memory) suitable for use as the client device 120 and/or for configuration as the application back-end server 130, the event server 140, the attribution server 150, and/or the coordination server 160 as described in further detail with reference to FIG. 1A and elsewhere herein. FIG. 1B also further illustrates the network 110, which enables communication between various nodes, e.g., communication between the client devices 120 and servers such as the application back-end server 130 and/or the event server 140.

Still referring to FIG. 1A, the client devices 120 can include a computing system, or processor-based device, that executes applications, presents output to a user, and receives input from the user are shown. The client device 120 may be any kind of computing device, including, for example, a desktop computer, a laptop or notepad computer, a mobile device such as a tablet or electronic pad, a personal digital assistant, a smart phone, a video gaming device, a television or television auxiliary box (also known as a set-top box), a kiosk, a hosted virtual desktop, or any other such device capable of exchanging information via the network 110. The client device 120 can be configured to exchange information with other computing devices of FIG. 1A via the network 110.

For example, the client device 120 can be configured to exchange information over the network 110 using protocols in accordance with the Open Systems Interconnection (OSI) layers, e.g., using an OSI layer-4 transport protocol such as the User Datagram Protocol (UDP), the Transmission Control Protocol (TCP), or the Stream Control Transmission Protocol (SCTP), layered over an OSI layer-3 network protocol such as Internet Protocol (IP), e.g., IPv4 or IPv6. In some implementations, the client device 120 includes one or more hardware elements for facilitating data input and data presentation, e.g., a keyboard, a display, a touch screen, a microphone, a speaker, and/or a haptic feedback device. In some implementations, the client device 120 includes buttons, e.g., function-specific buttons (e.g., audio device volume controls such as volume up, volume down, mute, etc.) and/or function agnostic buttons (e.g., a soft button that can be assigned specific functionality at a software level). In some implementations, the client device 120 includes one or more sensors capable of detecting movement of the client device 120 itself, e.g., an accelerometer, gyroscope, and/or tilt sensor.

An accelerometer may be a single-axis or multi-axis accelerometer. In some implementations, the client device 120 includes an Inertial Measurement Unit (IMU). In some implementations, the client device 120 is implemented using special purpose logic circuitry, e.g., an application specific integrated circuit (ASIC). In some implementations, the client device 120 is implemented using a system on a chip (SoC) semiconductor device that includes at least one processor (or microprocessor) core. In some implementations, the client device 120 is implemented using a general purpose computing processor. FIG. 1B illustrates a computing device 101 that, in some configurations, is suitable for use as the client device 120.

In some implementations, the client device 120 runs an operating system managing execution of software applications on the client device 120. In some implementations, the operating system is provided with the client device 120. In some implementations, the client device 120 executes a browser application (e.g., a web browser) capable of receiving data formatted according to the suite of hypertext application protocols such as the Hypertext Transfer Protocol (HTTP) and/or HTTP encrypted by Transport Layer Security (HTTPS).

In some such implementations, the browser facilitates interaction with one or more servers via interfaces presented at the client device 120 in the form of one or more web pages. In some implementations, the browser application is provided with the client device 120. In some implementations, the client device 120 executes a custom application, e.g., a game or other application that interacts with servers, e.g., an application back-end server 130. Interactions between the custom application and the application back-end server may use standard protocols such as HTTP and HTTPS, or may use application-specific protocols, e.g., a custom application layer protocol implemented over a transport-layer protocol such as UDP, TCP, or SCTP. In some implementations, the client device 120 includes a tool for obtaining and/or installing additional applications (such as the custom application) on the client device 120. In some implementations, one or more of the servers with which the client device 120 communicates supports a custom instruction set, e.g., an application programming interface (API), and the custom application executed on the client device 120 implements the API. An application can implement an API using, for example, a library or software development kit (SDK) provided to the application's developer.

The client device 120 can be configured to communicate (or exchanges data) with various servers such as the application back-end server 130 and/or the event server 140. In some implementations, the one or more of the servers 130, 140, 150, and 160 are implemented using special purpose logic circuitry, e.g., an application specific integrated circuit (ASIC). In some implementations, one or more of the servers 130, 140, 150, and 160 are implemented using a system on a chip (SoC) semiconductor device that includes at least one processor (or microprocessor) core. In some implementations, one or more of the servers 130, 140, 150, and 160 are implemented using a general purpose computing processor. FIG. 1B illustrates a computing device that, in some configurations, is suitable for use as the application back-end server 130, the event server 140, the attribution server 150, and/or the coordination server 160.

In FIG. 1A, the application back-end server 130 can provide back-end support to an application executing on the client device 120. In some implementations, the application back end server 130 runs a service that receives data from the client device 120 and sends data to the client device 120. For example, the application executing on the client device 120 may be a browser, e.g., a web browser presenting content provided by the application back-end server 130. The application executing on the client device 120 may be a game, e.g., a multi-player game where game data for the different players is stored by the application back-end server 130.

The application executing on the client device 120 may be a transaction facilitator, e.g., an access ticket or transit ticket management application, a coupon handler, or a payment processor, where some data for the transaction may be stored or authenticated by the application back-end server 130, the application executing on the client device 120 may be a utility where some functions for the application are provided by the application back-end server 130 or any other sort of client application that utilizes a back-end server 130 for support. In some implementations, storing data remotely from the client device 120 allows for asynchronous interaction between multiple users or client devices, facilitates recovery in the event of a client device 120 failure, and provides an interface to the world beyond the network.

The event server 140, like the application back-end server 130, can provide server-side functionality to an application executing on the client device 120. The application executing on the client device 120 can be configured to generate and transmit requests or event notifications to the application back-end server 130 and/or to an event server 140. For example, the application may request specific data from the application back-end server 130 or notify the event server 140 of a state change at the client device 120. In some implementations, the application back-end server 130 and the event server 140 are the same server, or are operated or managed by the same party, e.g., in the same autonomous system (AS) network.

In some implementations, the application back-end server 130 and the event server 140 are distinct servers and, in some implementations, are operated or managed by different parties. That is, in some implementations, the event server 140 may be controlled by a third-party. In some implementations, the application executing on the client device 120 can be configured to generate and transmit event notifications to the event server 140 for events such as an initial installation of the application on the client device 120, a start-up event for the application at the client device 120, a user-interaction event such as a selection event at the client device 120, redemption events where the application has consumed a limited-resource (e.g., a ticket application might notify the event server that the ticket has been used to gain access to an event or transit), error events such as an application failure at the client device 120, and so forth. In some implementations, the application back-end server 130 can be configured to determine that an event has occurred and provide the notification to the event server 140. For example, the client device 120 may notify the back-end server 130, which in turn notifies the event server 140.

The attribution server 150 can be a computing system that manages data for correlating events and identifying attribution. The attribution server 150 can be configured to interact with the coordination server 160 to identify coordination events attributable for events handled by the event server 140. In some implementations, the event server 140 can be configured to interact with the attribution server 150 to determine event sequences corresponding to attribution. In some implementations, the event server 140 and the attribution server 150 are the same server, or are operated or managed by the same party, e.g., in the same autonomous system (AS) network. In some implementations, the event server 140 and the attribution server 150 are distinct servers and, in some implementations, are operated or managed by different parties. That is, in some implementations, the attribution server 150 may be controlled by a third-party.

The coordination server 160 can be a computing system configured to coordinate events. In some implementations, the coordination server 160 sends coordination messages to the client device 120 and receives indications of responses to the coordination messages. The coordination messages may, for example, be invitations to take an action (e.g., to install an application, to access a web page, or to make a purchase) and the response may indicate a result (e.g., execution of the installed application, a request to access the web page, or a purchase transaction). Events may form a sequence that culminates in an outcome event (e.g., installation of an application), and the attribution server 150 identifies associations between events to identify one or more events for attribution in the sequence culminating with the outcome event. In some implementations, the attribution server 150 identifies a penultimate event for attribution as directly leading to the outcome event. In some instances, the coordination message may result in a series of events where the coordination server 160 is not involved.

For example, the coordination message may connect a client device 120 to an application installation interface; the coordination server 160 may receive a response indicating that the client device 120 has accessed the application installation interface, but might not receive any further information such as whether an application was installed on the client device 120 from the application installation interface. If the application is later installed on the client device 120, it may be that the installation event is attributable to the invitation, or it may be that an intervening event (e.g., an invitation originating at another coordination server) should be attributed.

The coordination server 160 can be configured to store and/or retrieve data in the data storage 190. The data stored in the data storage 190 may include, for example, configuration data, coordination message data, and statistics for coordination messages. The data storage 190 may be implemented using one or more data storage devices. The data storage devices may be any memory device suitable for storing computer readable data. The data storage devices may include a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or BLU-RAY discs). Example implementations of suitable data storage devices include storage area networks (SAN), network attached storage (NAS), and redundant storage arrays (e.g., RAID arrays). In some implementations, the data storage 190 hosts a relational database, e.g., using a Relational Database Management System (RDBMS). In some implementations, the data storage 190 manages data stored as files, e.g., XML files.

Although not shown in FIG. 1A, multiple servers, including the application back-end server 130, the event server 140, the attribution server 150, and/or the coordination server 160, may use independent or shared data storage systems such as the illustrated data storage 190.

Referring now to FIG. 1B, a block diagram of an example computing system 101 is shown, according to an illustrative implementation. The computing system 101 is suitable for use in implementing the computerized components described herein, in accordance with an illustrative implementation. In broad overview, the computing system 101 includes a processor 102 for performing actions in accordance with instructions, e.g., instructions held in cache memory 103. The illustrated example computing system 101 includes one or more processors 102 and coprocessors 104 in communication, via a bus 105, with main memory 106, a network interface controller 107, an input/output (I/O) interface 108, and a data storage 109. In some implementations, the computing system 101 may include additional interfaces or other components 116.

In some implementations, a processor 102 can be configured to load instructions from the main memory 106 (or from data storage 109) into cache memory 103. Furthermore, the processor 102 can be configured to load instructions from cache memory 103 into onboard registers and execute instructions from the onboard registers. In some implementations, instructions are encoded in and read from a read-only memory (ROM) or from a firmware memory chip (e.g., storing instructions for a Basic I/O System (BIOS)), not shown.

As shown, the processor 102 is directly connected to the cache memory 103. However, in some implementations, the cache memory 103 is integrated into the processor 102 and/or implemented on the same circuit or chip as the processor 102. Some implementations include multiple layers or levels of cache memory 103, each further removed from the processor 102. Some implementations include multiple processors 102 and/or coprocessors 104 that augment the processor 102 with support for additional specialized instructions (e.g., a math coprocessor, a floating point coprocessor, and/or a graphics coprocessor). As shown, the coprocessor 104 is closely connected to the processor 102. However, in some implementations, the coprocessor 104 is integrated into the processor 102 or implemented on the same circuit or chip as the processor 102. In some implementations, the coprocessor 104 is further removed from the processor 102, e.g., connected to the bus 105.

The network interface controller 107 can be configured to control one or more network interfaces 117 for connection to network devices 114 (e.g., for access to a network 110). The I/O interface 108 can be configured to facilitate sending and receiving data to various I/O devices 118 such as, but not limited to, keyboards, touch screens, microphones, motion sensors, video displays, speakers, haptic feedback devices, printers, and so forth. In some implementations, one or more of the I/O devices 118 are integrated into the computing system 101. In some implementations, one or more of the I/O devices 118 are external to, and separable from, the computing system 101. In some implementations, the computing system 101 is implemented using special purpose logic circuitry, e.g., an application-specific integrated circuit (ASIC) or a system on a chip (SoC) semiconductor device that includes the processor 102 and one or more additional components, e.g., the cache memory 103, network interface controller 107 and network interface 117, and one or more I/O interfaces 108.

The processors 102 can be any logic circuitry that processes instructions, e.g., instructions fetched from the cache memory 103, main memory 106, data storage 109, or other memory not shown. The processor 102 includes a number of data and instruction registers. In some implementations, on start-up (boot), the processor 102 can be configured to load initial instructions from a BIOS into the registers, including instructions for loading more instructions, and executes instructions from the registers. In some implementations, the BIOS instructions cause the processor 102 to load an operating system (OS), which in turn causes the processor 102 to load and execute one or more programs.

The processors 102 may be augmented by one or more ancillary coprocessors 104, which are auxiliary processing units with specialized instruction sets for specific purposes. In some implementations, the processor 102 faced with an unrecognized instruction will pass the instruction to the coprocessor 104, e.g., via a special bus, and only generate an un-recognized instruction fault if the coprocessor 104 also does not recognize the instruction. The processors 102 and coprocessors 104 may each be single core or multi-core processor(s).

The computing system 101 may include multiple distinct processors 102 and/or multiple distinct coprocessors 104. For example, in some implementations, a general purpose processor 102 such as a multi-core central processing unit (CPU) may be augmented with one or more special purpose coprocessors 104, such as a math coprocessor, floating point coprocessor, or a graphics processing unit (GPU). For example, a math coprocessor 104 can assist the processor 102 with high precision or complex calculations. In some implementations, the processor(s) 102 and coprocessors 104 are implemented as circuitry on one or more chips. The computing system 101 may be based on any processor 102, or set of processors 102 and/or coprocessors 104, capable of operating as described herein.

The cache memory 103 is generally a form of computer memory placed in close proximity to a processor 102 for fast access times. In some implementations, the cache memory 103 is memory circuitry that is part of, or on the same chip as, a processor 102. In some implementations, there are multiple levels of cache memory 103, e.g., L2 and L3 cache layers. In some implementations, multiple processors 102, and/or multiple cores of a processor 102, share access to the same cache memory 103.

The main memory 106 may be any device suitable for storing computer readable data. The main memory 106 is a device that supports direct access to specified addresses; i.e., the main memory 106 is random access memory (RAM). In some implementations, the main memory 106 is a volatile semiconductor memory device such as dynamic random-access memory (DRAM), synchronous dynamic random-access memory (SDRAM), double data rate SDRAM (DDR SDRAM), static random-access memory (SRAM), T-RAM, Z-RAM, and so forth. The computing system 101 may have any number of devices serving as main memory 106.

The data storage 109 may be any device suitable for storing computer readable data between power cycles. In some implementations, the data storage 109 is a device with fixed storage media, such as magnetic disks, e.g., a hard disk drive (HDD). In some implementations, the data storage 109 is a device with removable storage media, such as magnetic disks (e.g., a floppy disk drive or removable HDD), magnetic tape, magneto-optical disks, or optical discs (e.g., CD ROM, DVD-ROM, or BLU-RAY discs). In some implementations, the data storage 109 is a non-volatile semiconductor memory device such as an erasable programmable read-only memory (EPROM), electrically erasable programmable read-only memory (EPROM), or Flash memory. In some implementations, the main memory 106 is a solid-state drive (SSD), e.g., using multi-level cell (MLC) NAND-based Flash memory. A computing system 101 may have any number of devices serving as data storage 109.

Still referring to FIG. 1B, the bus 105 is an interface that provides for data exchange between the various internal components of the computing system 101, e.g., connecting the processor 102 to the main memory 106, the network interface controller 107, the I/O interface 108, and data storage 109. In some implementations, the bus 105 further provides for data exchange with one or more components external to the computing system 101, e.g., other components 116. In some implementations, the bus 105 includes serial and/or parallel communication links. In some implementations, the bus 105 implements a data bus standard such as integrated drive electronics (IDE), peripheral component interconnect express (PCI), small computer system interface (SCSI), or universal serial bus (USB). In some implementations, the computing system 101 has multiple busses 105.

The computing system 101 may include, or provide interfaces 108 for, one or more input or output (I/O) devices 118. The I/O devices 118 include input devices such as, without limitation, keyboards, touch screens, touchpads (e.g., electromagnetic induction pads, electrostatic pads, capacitive pads, etc.), microphones, joysticks, foot pedals, Inertial Measurement Units (IMUs), accelerometers, gyroscopes, tilt-sensors, motion sensors, environmental sensors, Musical Instrument Digital Interface (MIDI) input devices such as MIDI instruments (e.g., MIDI keyboards), styluses, and pointing devices such as a mouse or trackball. Output devices include, without limitation, video displays, speakers, haptic feedback devices, refreshable Braille terminals, lights, servos, MIDI output devices such as MIDI synthesizers, and two or three dimensional printers (including, but not limited to, inkjet printers, laser printers, thermographic printers, stereolithographic printers, extrusion deposition printers, and metal sintering printers).

The network 110 enables communication between various nodes such as the computing system 101 and a network device 114. In some implementations, data flows through the network 110 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 110 layered over an OSI layer-3 network protocol such as Internet Protocol (IP), e.g., IPv4 or IPv6. The network 110 is composed of various network devices (nodes) linked together to form one or more data communication paths between participating devices. Each networked device includes at least one network interface for receiving and/or transmitting data, typically as one or more data packets. An illustrative network 110 is the Internet; however, other networks may be used. The network 110 may be an autonomous system (AS), i.e., a network that is operated under a consistent unified routing policy (or at least appears to from outside the AS network) and is generally managed by a single administrative entity (e.g., a system operator, administrator, or administrative group).

The network 110 may be composed of multiple connected sub-networks or AS networks, which may meet at one or more of: an intervening network (a transit network), a dual-homed gateway node, a point of presence (POP), an Internet eXchange Point (IXP), and/or additional other network boundaries. The network 110 can be a local-area network (LAN) such as a company intranet, a metropolitan area network (MAN), a wide area network (WAN), an inter network such as the Internet, or a peer-to-peer network, e.g., an ad hoc Wi-Fi peer-to-peer network. The data links between nodes in the network 110 may be any combination of physical links (e.g., fiber optic, mesh, coaxial, twisted-pair such as Cat-5 or Cat-6, etc.) and/or wireless links (e.g., radio, satellite, microwave, etc.).

The network 110 can include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including, but not limited to, so-called generation 3G, 4G, and 5G protocols. The network 110 can include short-range wireless links, e.g., via Wi-Fi, BLUETOOTH, BLE, or ZIGBEE, sometimes referred to as a personal area network (PAN) or mesh network. The network may be public, private, or a combination of public and private networks. The network 110 may be any type and/or form of data network and/or communication network.

The network interface controller 107 manages data exchanges with devices in the network 110 (e.g., the network device 114) via the network interface 117 (sometimes referred to as a network interface port). The network interface controller 107 handles the physical and data link layers of the Open Systems Interconnection (OSI) model for network communication. In some implementations, some of the network interface controller's tasks are handled by the processors 102 and/or coprocessors 104. In some implementations, the network interface controller 107 is incorporated into the processor 102, e.g., as circuitry on the same chip. In some implementations, a computing system 101 has multiple network interfaces 117 controlled by a single controller 107. In some implementations, a computing system 101 has multiple network interface controllers 107. In some implementations, each network interface 117 is a connection point for a physical network link (e.g., a Cat-5 Ethernet link).

In some implementations, the network interface controller 107 supports wireless network connections and an interface 117 is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In some implementations, the network interface controller 107 implements one or more network protocols such as Ethernet. Generally, the computing system 101 can be configured to exchange data with other computing devices via physical or wireless links through a network interface 117. The network interface 117 may link directly to another device or to another device via an intermediary device, e.g., a network device 114 such as a hub, a bridge, a switch, or a router, connecting the computing system 101 to the network 110.

The network device 114 may be a hub, switch, router, modem, network bridge, another computing system 101, or any other network node. In some implementations, the network device 114 is a network gateway. In some implementations, the network device 114 is a routing device implemented using customized hardware such as a special purpose processor and/or a ternary content-addressable memory (TCAM).

The other components 116 may include an alternative I/O interface, external serial device ports, and any additional coprocessors 104 that are connected via the bus 105. For example, a computing system 101 may include an interface (e.g., a universal serial bus (USB) interface) for connecting external input devices, output devices, or additional memory devices (e.g., portable flash drive or external media drive).

The illustrated computing system 101 is suitable for implementing systems that manage or organize data. For example, in some implementations, the computing system 101 hosts a database. A database, or more specifically a database management system (DBMS), organizes data in accordance with a database definition, e.g., a database schema. For example, in a relational database, the DBMS maintains data in a table-like data structure. Each table has columns, each corresponding to an entry type, classification, or purpose. For example, a table might have a column for numerical data, a column for text data (e.g., a description of the numerical data), a column for date data, and so forth. In some implementations, a column represents structured data grouping multiple data elements into a single column. In a relational database, each entry in a column in a table is also in a row associating the entry with entries from other columns in the table.

In some instances, an entry (or combination of entries) will associate a row from one table with one or more rows in another table. In some DBMS implementations, virtual tables called "views" represent data pulled from one or more tables as though it, too, were a table (that is, the view looks to a database client or user as though it was a table, but is not necessarily stored as such). Other types of database management systems can also be used, including various types of relational databases, object oriented databases, document oriented databases, eXtensible Markup Language (XML) databases, NoSQL databases, and so forth. Many of these database types use tables, or table-like structures, in a manner similar to that described above in reference to relational databases. In some database implementations, data is stored or represented in a manner other than a table, e.g., as a collection of data tuples.

A client or user of a database can add data to, modify data in, or retrieve data from the database using database instructions, e.g., queries in a database query language such as the Structured Query Language (SQL). One or more database instructions may be grouped together into a database transaction. Traditionally, a database provides transaction atomicity consistency, isolation, and durability. These properties are known by the acronym ACID. In some implementations, a DBMS provides all of the ACID properties. However, in some implementations, the DBMS does not provide all of the ACID properties.

In some implementations, one or more clients devices 120, e.g., instances of the computing system 101, are in communication with the DBMS, e.g., via a direct link or via the network 110. In some implementations, one or more of the clients obtain data from the DBMS using queries in a formal query language such as Structured Query Language (SQL), Hyper Text Structured Query Language (HTSQL), Contextual Query Language (CQL), Data Mining Extensions (DMX), or XML Query (XQuery). In some implementations, one or more of the clients obtain data from the DBMS using an inter-process communication architecture such as the Common Object Request Broker Architecture (CORBA), Remote Procedure Calls (RPC), Object Linking and Embedding (OLE), Component Object Model (COM), or Distributed Component Object Model (DCOM). In some implementations, one or more of the clients obtain data from the DBMS using natural language or semantic queries. In some implementations, one or more of the clients obtain data from the DBMS using queries in a custom query language such as a Visualization API Query Language.

Figure 2:
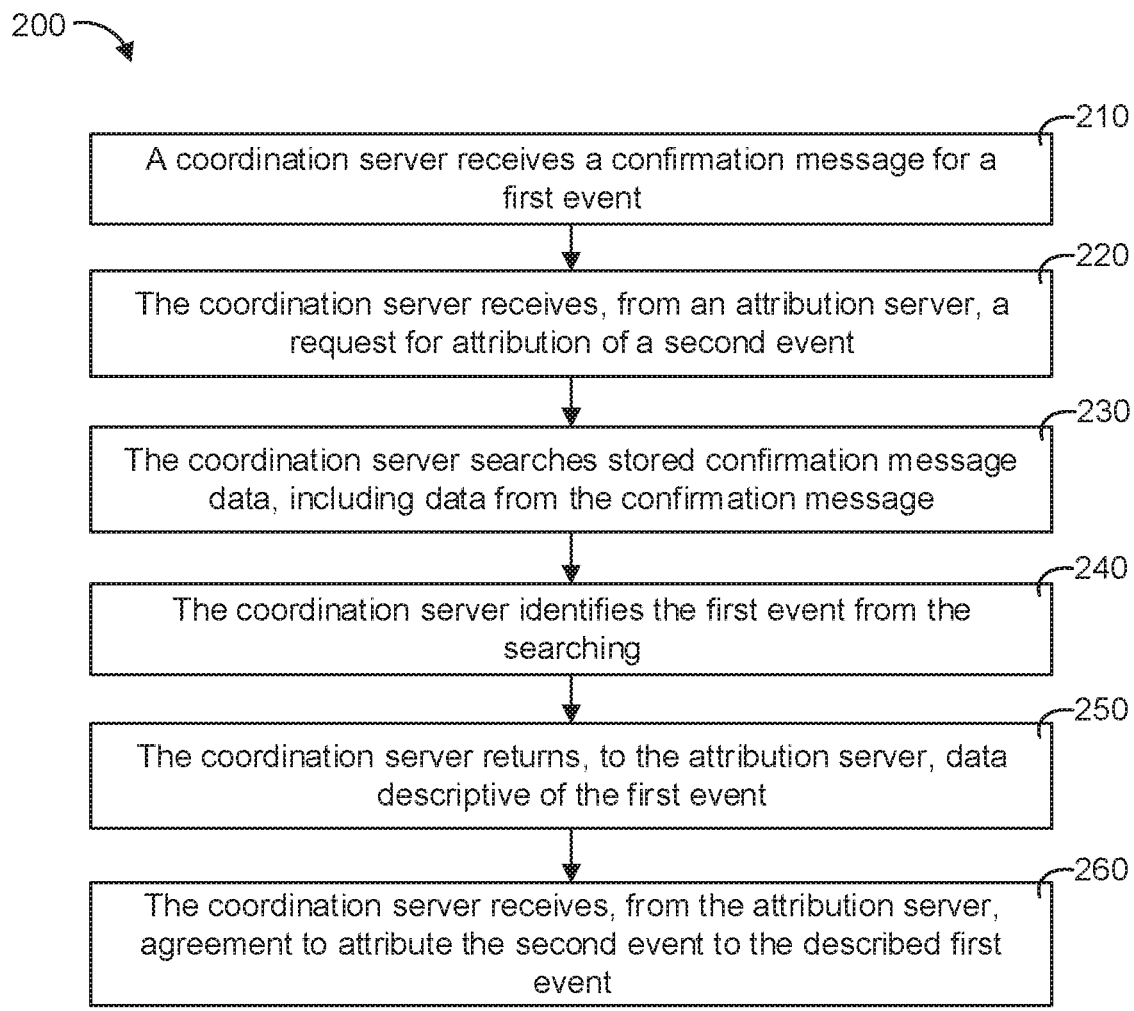
FIG. 2 is a flowchart for a method of correlating events for attribution with the servers of FIG. 1A, according to an illustrative implementation.

Referring now to FIG. 2, a flowchart for a method 200 for correlating events is shown, according to an illustrative implementation. The application back-end server 130, the event server 140, the attributions server 150, and/or the coordination server 160 can be configured to perform the method 200. Furthermore, any computing device described herein can be configured to perform the method 200.

In broad overview of the method 200, at stage 210, the coordination server 160 receives a confirmation message for a first event. The coordination server 160 may receive a large number of confirmation messages, each corresponding to a respective event. The messages may be received from a client device 120, from a third-party server, or from some other computing device. At stage 220, the coordination server 160 receives, from an attribution server 150, a request for attribution of a second event.

At stage 230, the coordination server 160 searches stored confirmation message data, e.g., data corresponding to a large number of confirmation messages, which include data for the confirmation message received in stage 210. At stage 240, the coordination server 160 identifies the first event from the searching. In some implementations, the first event is identified at stage 240 as one of multiple candidate events for attribution.

Figure 3:
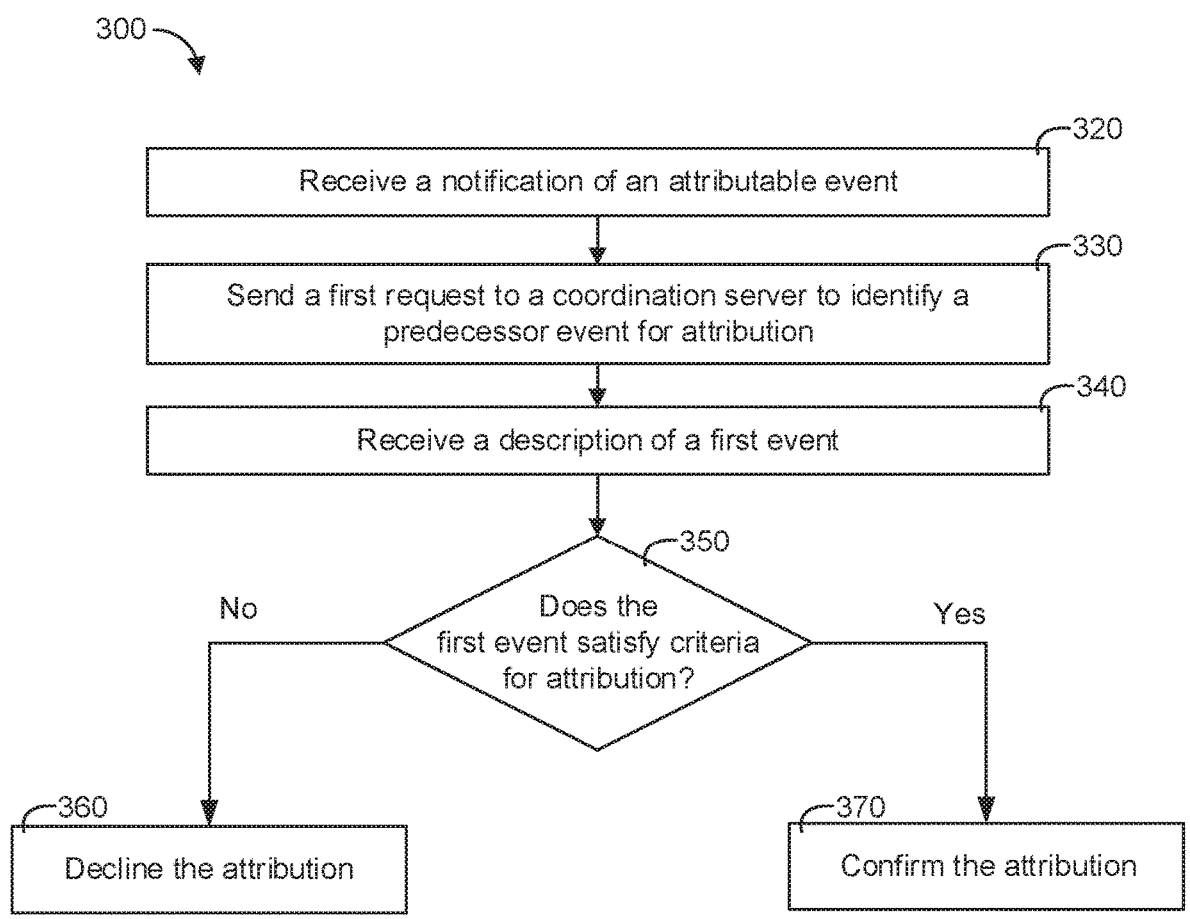
FIG. 3 is a flowchart for a method of confirming attribution of a second event to a predecessor event with the servers of FIG. 1A, according to an illustrative implementation.

At stage 250, the coordination server 160 returns, to the attribution server 150, data descriptive of the first event responsive to the request received at stage 220. The attribution server 150 can then determine, from the data descriptive of the first event, whether the second event can be attributed to the first event. FIG. 3, described below, illustrates an example method 300 of confirming attribution to a predecessor event, such as may be performed by the attribution server 150. The coordination server 160 then receives, at stage 260, agreement from the attribution server 150 to attribute the second event to the described first event. In some implementations, when the attribution server 150 determines that attribution should not be granted, the coordination server 160 alternatively receives a message declining attribution. In some implementations, when the attribution server 150 determines that attribution should not be granted, the coordination server 160 receives no further messages related to the attribution request and the first event description.

Referring to the method 200 in more detail, at stage 210, the coordination server 160 receives a confirmation message for a first event. In some implementations, the coordination server 160 sends coordination messages to one or more client devices 120. The coordination messages may, for example, be invitations to take an action (e.g., to install an application, to access a web page, or to make a purchase). The first event may be a response to an invitation, e.g., an indicator that a client device 120 receiving the invitation has interacted with it.

For example, an invitation may include a selectable element that provides additional information or facilitates a connection to a third-party where further actions may be taken. An invitation may include a hyperlink to a uniform resource locator (URL) for a web page (a landing page) at which further actions may be taken such as accessing additional information, joining a mailing list, making a purchase, streaming or downloading media (such as an e-book, visual image media, audio data, interactive media, video media, and so forth), downloading software, connecting to a database, and any other action. In some implementations, the first event is a selection of a URL (a click) at a client device 120. In some implementations, the first event is a page request (or page fetch) from the client device 120.

In some implementations, the first event is an arrival event, e.g., the client device 120 arriving at a geographic location. The arrival event may be detected, for example, using geo-location hardware in the client device 120. The arrival event may be detected, for example, using proximity detectors (e.g., near-field radio devices) in the client device 120 that detect proximity to physical markers external to the client device 120, or vice versa. In some implementations, the first event may be any event that could receive attribution for later subsequent events. For example, if the first event is an interaction that results in the client device executing an application installation tool, this may receive attribution for a subsequent application installation. At stage 210 of the method 200, the coordination server 160 receives a confirmation message for a particular first event.

Responsive to receiving the confirmation message for the first event at stage 210, the coordination server 160 records data about the first event, e.g., in data storage 190. For example, the recorded data about the first event may include a date and time stamp, an event type, and one or more source identifiers such as a device identifier, an account identifier, a unique CT number (e.g., a randomly generated unique identifier), and so forth. The recorded data about the first event may further include information about an invitation associated with the first event, e.g., an invitation identifier (or identifiers, e.g., a source identifier, a campaign identifier, destination identifier, CT number, etc.) and an invitation date and time stamp. In some implementations, the coordination server 160 records this data in a searchable data storage system such as a database.

At stage 220, the coordination server 160 receives, from an attribution server 150, a request for attribution of a second event. In some implementations, one or more of the client devices 120, the application back-end server 130, or the event server 140 process an event that occurs at the client device 120 or is associated with the client device 120, and in processing the event, seek attribution for the event. For example, the event server 140 may detect the second event and send a message to the attribution server 150 with information such as one or more identifiers (e.g., device identifier and application identifier) and event type. As described below, in reference to FIG. 3, the attribution server 150 then sends a request to the coordination server 160 for attribution of the second event. The request may be sent to multiple coordination servers, e.g., to different servers each operated by different parties that might each be associated with an attributable event.

At stage 230, the coordination server 160 searches stored confirmation message data, e.g., data corresponding to each of the large number of confirmation messages which can include data for the confirmation message received in stage 210. In some implementations, this search is directed to one or more specific event types, e.g., event types that may be attributed for the second event.

At stage 240, the coordination server 160 identifies the first event from the searching. In some implementations, the first event is identified at stage 240 as one of multiple candidate events for attribution. The coordination server 160 can identify the first event based on match criteria such as, for example, having a same device identifier, account identifier, or CT number.

At stage 250, the coordination server 160 returns, to the attribution server 150, data descriptive of the first event responsive to the request received at stage 220. The descriptive data may be, for example, a sub-set of the recorded data for the first event. For example, in some implementations, the coordination server 160 returns a date and time stamp for the first event, or returns the date and time stamp along with an internal identifier for the first event. The attribution server 150 can then determine, from the data descriptive of the first event, whether the second event can be attributed to the first event. For example, in some implementations, if multiple coordination servers 160 return attribution claims (i.e., each returns an identified candidate event for attribution), then the attribution server selects one of the attribution claims for confirmation.

FIG. 3, described below, illustrates an example method 300 of confirming attribution to a predecessor event, such as may be performed by the attribution server 150. In some implementations, for example, the attribution server 150 selects the last candidate event (i.e., the candidate event with the date and time stamp closest in time to the second event).

At stage 260, the coordination server 160 receives agreement from the attribution server 150 to attribute the second event to the described first event. In some implementations, when the attribution server 150 determines that attribution should not be granted, the coordination server 160 alternatively receives a message declining attribution. In some implementations, when the attribution server 150 determines that attribution should not be granted, the coordination server 160 receives no further messages related to the attribution request and the first event description. The coordination server 160 may retain data about attributions, e.g., for reporting or decision making purposes. In some implementations, a campaign administrator may request, for example, a report of invitations attributed with subsequent events. This report can be configured, for example, to omit events that did not receive attribution, or to highlight (or otherwise indicate) events that specifically did receive attribution.

Referring now to FIG. 3, a flowchart for a method 300 for confirming attribution to a predecessor event is shown, according to an illustrative implementation. Specifically, the method 300 can be performed by the attribution server 150 to determine attribution for a second event by communicating with a coordination server. The application back-end server 130, the event server 140, the attributions server 150, and/or the coordination server 160 can be configured to perform the method 300. Furthermore, any computing device described herein can be configured to perform the method 300.

In broad overview of the method 300, at stage 320, the attribution server 150 receives a notification of an attributable event. At stage 330, the attribution server 150 sends a first request for attribution to a coordination server 160. The coordination server 160 then identifies a first event that could be attributed, and provides a description of the first event to the attribution server 150. At stage 340, the attribution server 150 receives the description of the first event and, at stage 350, determines whether the first event satisfies criteria for attribution. If the first event does not satisfy the criteria for attribution, then at stage 360, the attribution server 150 declines the attribution. However, when the first event satisfies the criteria for attribution at stage 350, then at stage 370, the attribution server 150 confirms the attribution. For example, in some implementations, the attribution server 150 sends a second message to the coordination server 160 attributing the attributable event to the first event.

Referring to the method 300 in more detail, at stage 320, the attribution server 150 receives a notification of an attributable event. For example, an event server 140 may notify the attribution server 150 of the event. In some implementations, one or more of the client devices 120, the application back-end server 130, or the event servers 140 process an event that occurs at the client device 120 or is associated with the client device 120, and in processing the event, seek attribution for the event. For example, the event server 140 may detect the event and send a message to the attribution server 150 with information such as one or more identifiers (e.g., device identifier and application identifier) and event type. In some implementations, the attribution server 150 detects the attributable event and resolves attribution for the event.

At stage 330, the attribution server 150 sends a first request to a coordination server 160. The first request is a request to identify a predecessor event for attribution. The first request may be an inquiry, from the attribution server 150 to the coordination server 160, to see if the coordination server 160 had previously coordinated an event that led to, or can be attributed with leading to, the attributable event. In some implementations, the request is sent to multiple different coordination servers each operated by different parties that might each be associated with an attributable event. When the coordination server 160 can identify a first event that could be attributed, the coordination server 160 provides a description of the first event to the attribution server 150. In some implementations, the coordination server 160 (or multiple coordination servers) may return descriptions of multiple candidate events for possible attribution.

At stage 340, the attribution server 150 receives the description of the first event and, at stage 350, determines whether the first event satisfies criteria for attribution. In some implementations, the attribution server 150 confirms whether the described first event could have led to the attributable event. In some implementations, the attribution server 150 determines whether there was an intervening event that should receive attribution. For example, when the attribution server 150 sends requests to multiple different coordination servers in stage 330, it may receive multiple contenders in response. The attribution server 150 selects from among the multiple contenders, e.g., identifying one contender event for attribution and declining the remainder.

A contender received from a competing coordination server may be an intervening event, causing the attribution server 150 to decline attribution to the first event. In some implementations, the attribution server 150 constructs a timeline or sequence of events leading up to the attributable event and selects one or more events from the timeline for attribution. In some such implementations, the attribution server 150 selects the last event from the timeline preceding the attributable event. If the described first event (as received in stage 340) is not selected, then the attribution server 150 declines attribution at stage 360. If the described first event (as received in stage 340) is selected, then the attribution server 150 provides or confirms attribution at stage 370.

At stage 360, the attribution server 150 declines the attribution. In some implementations, the attribution server 150 takes no action to decline attribution. That is, the absence of a confirmation may be sufficient to decline. In some implementations, the attribution server 150 provides a declining notification to the coordination server 160.

At stage 370, the attribution server 150 confirms the attribution. For example, in some implementations, the attribution server 150 sends a second message to the coordination server 160 attributing the attributable event to the first event. In some implementations, the attribution server 150 provides the coordination server 160 with additional information in the confirmation. The additional information may include, for example, a unique event identifier that the coordination server 160 can store and use later as evidence of the attribution. In some implementations, the additional information includes a token, an encrypted element of data, or an identifier. In some implementations, the additional information includes a CT number.

In some implementations, the event server 140 provides a notification to an attribution server 150 each time an application is executed at a client device 120. For example, in some implementations, the application sends a message on start-up to a back-end server 130 (e.g., a request for any recent updates) and the back-end server 130 then sends a message to the event server 140 documenting the start-up event. In some implementations, the application sends a message to the event server 140 documenting the start-up event. The message may be sent, for example, as an HTTP request. In some implementations, the event server 140 then records data representing the event. In some implementations, the event server 140 sends a message to the attribution server 150 notifying the attribution server 150 of the start-up event. In some implementations, the event server 140 sends this message to the attribution server 150 for a first start-up event, which would correspond to a new installation, and does not send a message to the attribution server 150 for subsequent start-up events for the same application instance. The attribution server 150 then identifies a previous coordination event for attribution, e.g., using the method 300 described above.

In some implementations, the coordination server 160 maintains data for each event and for each attribution request. The coordination server 160 may provide an administrative interface through which an administrator can obtain reports of statistics for events and attributions. Because some events might not receive attribution, e.g., because an intervening event controlled by a third-party received the attribution, the statistics will correspond to the same statistics the administrator might receive from third-parties. Proper representation of attribution can eliminate confusion and reduce configuration cycles. Further, when the coordination server 160 only receives data for attributed events, it does not receive unnecessary third-party data.

Figure 4:
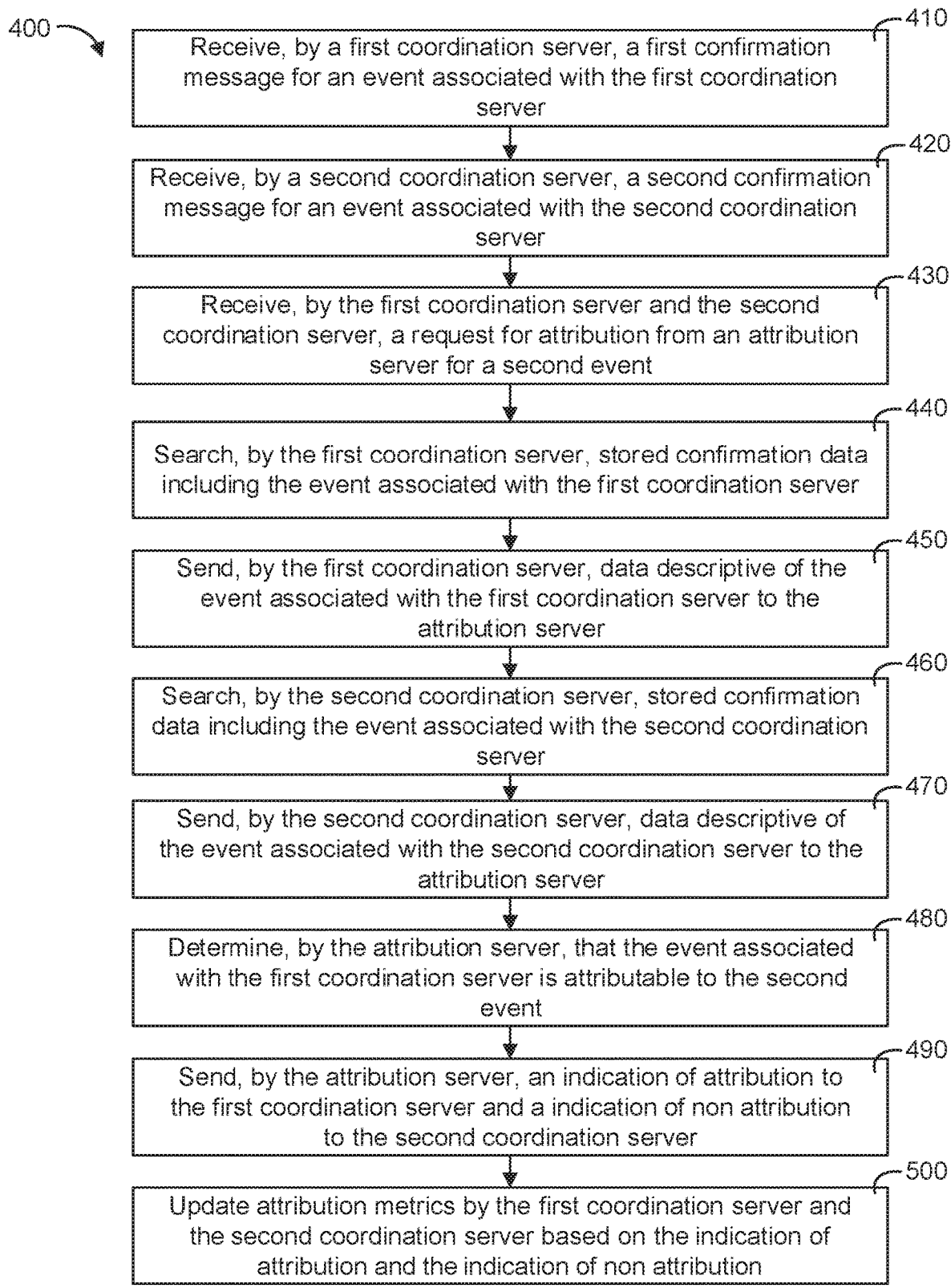
FIG. 4 is a flowchart for a method for attributing events of multiple coordination servers, according to an illustrative implementation.

Referring now to FIG. 4, a method 400 is shown for performing cross-network event attribution to de-duplicate attribution of events, according to an illustrative implementation. The application back-end server 130, the event server 140, the attribution server 150, the coordination server 160, and/or any other computing device described herein can be configured to perform the method 400. Specifically, the method 400 makes reference to a first coordination server and a second coordination server. These servers may be the same and/or similar to the coordination server 160.

The first coordination server and the second coordination server can be configured to provide (or may be associated with servers that provide) content items to a user and receive online user activity with the content items. However, the two coordination servers may be distinct and may be operated by different entities. If a content provider uses the first and second coordination servers to provide content to a user and receive user activity, when a conversion occurs, both coordination servers may attribute user event activities associated with their content network to the conversion. The method 400 described below and the other methods described herein can de-duplicate attribution by determining which activities should be attributed to the conversion and which activities should not be attributed to the conversion.

The method 400 is performed in such a way that user data privacy is maintained and network bandwidth is conserved. Specifically, in the method 400, entire sets of user event activity are not shared between the servers, i.e., the first coordination server, the second coordination server, and the attribution server only share data which may be attributable rather than aggregating all user event data together to determine event attribution. Furthermore, only sending required data reduces bandwidth usage as compared to sending large sets of user event data to a central server, e.g., the attribution server. Furthermore, user online activity can be improved. Since the first coordination server receives activity of a user across one content network and the second coordination server receives activity of the user from a second content network, a user event may only be received by one of the coordination servers instead of both.

In steps 410 and 420, the first coordination server and the second coordination server may each receive an event. The events may be a user related activity associated with the first coordination server and the second coordination server respectively. For example, the first coordination server may receive directly, or otherwise receive event data from another device, for a first content network. The second coordination server may receive, or otherwise receive event data from another device, for a second content network.

A second event may occur after the events associated with the first and second coordination servers. In some implementations, the second event is a conversion. The conversion may include downloading and/or installing a mobile application, purchasing a product via an online shopping website, or subscribing to a service. Both coordination servers may become aware of the second event and determine that the events associated with the first and second coordination servers should receive attribution for the event. However, this may be duplicated attribution, i.e., only one of the two coordination servers should have an event that is attributed to the second event.

In step 430, the first and second coordination servers receive a request for attribution of the second event from the attribution server 150. In response to receiving the request for attribution of the second event, each coordination server can perform a search of all confirmation data associated with user events can be searched.

In step 440, the first coordination server can search confirmation data to identify an event that potentially could, or currently is, being attributed to the second event. In some embodiments, the first coordination server searches the confirmation messages based on a user identifier associated with the second event and user identifiers associated with the events of the confirmation data. In some embodiments, the first coordination server may use an identifier map which maps multiple identifiers together in order to properly attribute events performed with different accounts, different devices, etc. The result of searching the confirmation data may identify the event associated with the first coordination server.

In step 450, the first coordination sever can send data indicative of the first event to the attribution server 150. Steps 460 and 470 can be the same as and/or similar to the steps 440 and 450. However, the steps 460 and 470 can be performed by the second attribution server.

In step 480, the attribution server 150 can determine whether the second event is attributable to the event associated with the first coordination server and the event associated with the second coordination server. In some implementations, the attribution server 150 can determine the attribution based on time stamps associated with the second event, the event associated with the first coordination server, and the event associated with the second coordination server. The attribution server 150 can determine that the event occurring closest in time to the second event should be attributable to the second event. Furthermore, the attribution server 150 can determine that an event is attributable if is occurred within a predefined amount of time before the second event.

For example, if the events occurred in the following order, 1) event associated with the second coordination server, 2) event associated with the first coordination server, and 3) the second event, the attribution server 150 may determine that the event associated with the first coordination server should be attributed to the second event while the event associated with the second coordination server should not be attributed to the second event.

In step 490, the attribution server 150 can send an indication of attribution or no attribution to the first and second coordination servers. The second coordination server may receive an indication that the event associated with the second coordination server should not be attributed to the second event while the first coordination server may receive an indication that the event associated with the first coordination serve should be attributed to the second event.

In step 500, based on the indications of attribution or no attribution, the first and second coordination servers can update their attribution metrics based on the indications received in step 490. The attribution metrics may be total conversion, total conversions for particular content items, etc.

For example, if the second coordination server attributes the event associated with the second coordination server with the second event but receives an indication from the attribution server 150 that the event associated with the second coordination server is not attributable to the second event, the second coordination server may update data and/or metrics stored by the second coordination server so that the second coordination server does not attribute the event associated with the second coordination server to the second event. This deduplication of event attribution can improve content provider interfaces that may report data by improving the accuracy of the metrics displayed in the interface.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus (including, e.g., a processor 102). A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer executable instructions, in a non-transitory form.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A method for providing cross content network event attribution, the method comprising:
   receiving, by a first coordination server, an event attribution request for a conversion event from an attribution server, wherein the conversion event is an online activity performed by a user via one of a plurality of user devices after a first interaction event and a second interaction event, wherein the first interaction event is a first online activity performed by the user via one of the plurality of user devices with one or more content items managed by the first coordination server, wherein the second interaction event is a second online activity performed by the user via one of the plurality of user devices with one or more second content items managed by a second coordination server, wherein the first coordination server, the second coordination server, and the attribution server are each separate server systems, wherein the one or more content items and the first interaction event are stored in a first data storage system of the first coordination server, wherein the one or more second content items and the second interaction event are stored separately from the one or more content items and the first interaction event in a second data storage system of the second coordination server;

determining, by the first coordination server, whether the conversion event is attributable to the first interaction event by searching a plurality of confirmation messages for a plurality of interaction events comprising the first interaction event; and sending, by the first coordination server, to resolve duplicate attribution of the conversion event to the first interaction event and to the second interaction event, first data descriptive of the first interaction event to the attribution server in response to determining that the conversion event is attributable to the first interaction event, wherein the duplicate attribution is resolved by the attribution server with the first data descriptive of the first interaction event and second data descriptive of the second interaction event received by the attribution server from the second coordination server, wherein the duplicate attribution is resolved by the attribution server by updating attribution of the conversion event to both the first interaction event and the second interaction event to one of the first interaction event and the second interaction event.

2. The method of claim 1, further comprising determining, by the attribution server, whether the conversion event is attributable to the first interaction event, wherein determining whether the conversion event is attributable to the first interaction event is performed without accessing, by the attribution server, the plurality of confirmation messages.

3. The method of claim 1, the method further comprising receiving, by the first coordination server, an indication of agreement or an indication of disagreement for attribution of the conversion event to the first interaction event from the attribution server.

4. The method of claim 3, further comprising:
receiving, by the attribution server, a notification of the conversion event;
sending, by the attribution server, the event attribution request for the conversion event to the first coordination server;
receiving, by the attribution server, the first data descriptive of the first interaction event from the first coordination server;
determining, by the attribution server, whether the conversion event is attributable to the first interaction event based on the first data descriptive of the first interaction event;
sending, by the attribution server, the indication of agreement to the first coordination server in response to determining that the conversion event is attributable to the first interaction event; and
sending the indication of disagreement to the first coordination server in response to determining that the conversion event is not attributable to the first interaction event.

5. The method of claim 4, wherein determining, by the attribution server, whether the conversion event is attributable to the first interaction event comprises determining whether a duration in time between a first time stamp of the first interaction event and a second time stamp of the conversion event is less than a predefined amount, wherein the first data descriptive of the first interaction event comprises the first time stamp of the first interaction event.

6. The method of claim 3, further comprising:
sending, by the attribution server, the event attribution request for the conversion event to the second coordination server;
receiving, by the attribution server, the second data descriptive of the second interaction event associated with the second coordination server from the second coordination server;
determining, by the attribution server, whether the conversion event is attributable to the second interaction event associated with the second coordination server based on the second data descriptive of the second interaction event associated with the second coordination server;
sending, by the attribution server, the indication of agreement to the first coordination server in response to determining that the first interaction event is attributable to the second interaction event; and
sending, by the attribution server, the indication of disagreement to the second coordination server in response to determining that the second interaction event associated with the second coordination server is not attributable to the conversion event.

7. The method of claim 6, wherein the method further comprises:
updating, by the first coordination server, first attribution metrics of the first coordination server to indicate that the first interaction event is attributable to the conversion event in response to receiving the indication of agreement from the attribution server; and
updating, by the second coordination server, second attribution metrics of the second coordination server to indicate that the second interaction event associated with the second coordination server is not attributable to the conversion event in response to receiving the indication of disagreement from the attribution server.

8. The method of claim 7, wherein determining, by the attribution server, whether the conversion event is attributable to events associated with the second data descriptive of the second interaction event associated with the second coordination server comprises determining whether a first time stamp associated with the first interaction event or a third time stamp associated with the second interaction event associated with the second coordination server is closer in time to a second time stamp associated with the conversion event, wherein the second data descriptive of the second interaction event associated with the second coordination server comprises the third time stamp associated with the second interaction event associated with the second coordination server.

9. The method of claim 1, wherein determining, by the first coordination server, whether the conversion event is attributable to the first interaction event comprises searching the plurality of confirmation messages with a conversion identifier associated with the conversion event to determine a match between the conversion identifier associated with the conversion event and a first identifier associated with the first interaction event.

10. The method of claim 9, wherein searching the plurality of confirmation messages with the conversion identifier associated with the conversion event to determine the match between the conversion identifier associated with the conversion event and the first identifier associated with the first interaction event comprises determining, based on an identifier map that maps the conversion identifier of the conversion event to the first identifier associated with the first interaction event, whether the first identifier of the first interaction event maps to the conversion identifier of the conversion event.

11. A system for providing cross content network event attribution, the system comprising:
a first coordination server comprising a processing circuit configured to:
receive an event attribution request for a conversion event from an attribution server, wherein the conversion event is an online activity performed by a user via one of a plurality of user devices after a first interaction event and a second interaction event, wherein the first interaction event is a first online activity performed by the user via one of the plurality of user devices with one or more content items managed by the first coordination server, wherein the second interaction event is a second online activity performed by the user via one of the plurality of user devices with one or more second content items managed by a second coordination server, wherein the first coordination server, the second coordination server, and the attribution server are each separate server systems, wherein the one or more content items and the first interaction event are stored in a first data storage system of the first coordination server, wherein the one or more second content items and the second interaction event are stored separately from the one or more content items and the first interaction event in a second data storage system of the second coordination server;
determine whether the conversion event is attributable to the first interaction event by searching a plurality of confirmation messages for a plurality of interaction events comprising the first interaction event;
send, to resolve duplicate attribution of the conversion event to the first interaction event and to the second interaction event, first data descriptive of the first interaction event to the attribution server in response to determining that the conversion event is attributable to the first interaction event, wherein the duplicate attribution is resolved by the attribution server with the first data descriptive of the first interaction event and second data descriptive of the second interaction event received by the attribution server from the second coordination server, wherein the duplicate attribution is resolved by the attribution server by updating attribution of the conversion event to both the first interaction event and the second interaction event to one of the first interaction event and the second interaction event; and
receive an indication of agreement or an indication of disagreement for attribution of the conversion event to the first interaction event from the attribution server.

12. The system of claim 11, wherein the processing circuit is configured to determine whether the conversion event is attributable to the first interaction event by searching the plurality of confirmation messages with a conversion identifier associated with the conversion event to determine a match between the conversion identifier associated with the conversion event and a first identifier associated with the first interaction event.

13. The system of claim 12, wherein the processing circuit is configured to search the plurality of confirmation messages with the conversion identifier associated with the conversion event to determine the match between the conversion identifier associated with the conversion event and the first identifier associated with the first interaction event by determining, based on an identifier map that maps the conversion identifier of the conversion event to the first identifier associated with the first interaction event, whether the first identifier of the first interaction event maps to the conversion identifier of the conversion event.

14. The system of claim 11, wherein the processing circuit is configured to update attribution metrics of the first coordination server to indicate that the first interaction event is attributable to the conversion event in response to receiving the indication of agreement from the attribution server.

15. A system for providing cross content network event attribution, the system comprising:
an attribution server comprising a processing circuit configured to:
receive a notification of a conversion event, wherein the conversion event is an online activity performed by a user via one of a plurality of user devices after a first interaction event associated with a first coordination server and a second interaction event associated with a second coordination server, wherein the first interaction event is a first online activity performed by the user via one of the plurality of user devices with one or more content items managed by the first coordination server, wherein the second interaction event is a second online activity performed by the user via one of the plurality of user devices with one or more second content items managed by the second coordination server, wherein the first coordination server, the second coordination server, and the attribution server are each separate server systems, wherein the one or more content items and the first interaction event are stored in a first data storage system of the first coordination server, wherein the one or more second content items and the second interaction event are stored separately from the one or more content items and the first interaction event in a second data storage system of the second coordination server;
send an event attribution request for the conversion event to the first coordination server;
receive first data descriptive of the first interaction event from the first coordination server;
receive second data descriptive of the second interaction event from the second coordination server;
determine whether the conversion event is attributable to the first interaction event to resolve duplicate attribution of the conversion event to the first interaction event and to the second interaction event with the first data descriptive of the first interaction event and the second data descriptive of the second interaction event, wherein the duplicate attribution is resolved by the attribution server by updating attribution of the conversion event to both the first interaction event and the second interaction event to one of the first interaction event and the second interaction event;

send an indication of agreement to the first coordination server in response to determining that the conversion event is attributable to the first interaction event; and send an indication of disagreement to the first coordination server in response to determining that the conversion event is not attributable to the first interaction event.

16. The system of claim 15, wherein the processing circuit is configured to determine whether the conversion event is attributable to the first interaction event by determining whether the conversion event is attributable to the first interaction event without accessing, by the attribution server, a plurality of confirmation messages stored by the first coordination server, the plurality of confirmation messages comprising information about events associated with the first coordination server comprising the first interaction event.

17. The system of claim 15, wherein the processing circuit is configured to determine whether the conversion event is attributable to the first interaction event by determining whether a duration in time between a first time stamp of the first interaction event and a second time stamp of the conversion event is less than a predefined amount, wherein the first data descriptive of the first interaction event comprises the first time stamp of the first interaction event.

18. The system of claim 15, wherein the processing circuit is configured to:

send the event attribution request for the conversion event to the second coordination server;

receive the second data descriptive of the second interaction event associated with the second coordination server from the second coordination server, wherein the second interaction event associated with the second coordination server is another online activity performed by the user via one of the plurality of user devices before the conversion event;

determine whether the conversion event is attributable to the second interaction event associated with the second coordination server; and send the indication of disagreement to the second coordination server in response to determining that the first interaction event associated with the second coordination server is not attributable to the conversion event.

19. The system of claim 18, wherein the processing circuit is configured to determine whether the conversion event is attributable to the first interaction event by determining whether a first time stamp associated with the first interaction event or a third time stamp associated with the second interaction event associated with the second coordination server is closer in time to a second time stamp associated with the conversion event, wherein the second data descriptive of the second interaction event associated with the second coordination server includes the third time stamp.

20. The system of claim 15, wherein the indication of agreement and the indication of disagreement cause the first coordination server to update attribution metrics of the first coordination server to indicate that the first interaction event is attributable or is not attributable to the second interaction event.

* * * * *